US012202149B2

(12) United States Patent
Atherton et al.

(10) Patent No.: US 12,202,149 B2
(45) Date of Patent: Jan. 21, 2025

(54) TECHNIQUES FOR ROBOTIC WORKCELL DESIGN

(71) Applicant: AUTODESK, INC., San Francisco, CA (US)

(72) Inventors: Evan Patrick Atherton, Castro Valley, CA (US); Ardavan Bidgoli, San Rafael, CA (US)

(73) Assignee: AUTODESK, INC., San Francisco, CA (US)

( * ) Notice: Subject to any disclaimer, the term of this patent is extended or adjusted under 35 U.S.C. 154(b) by 420 days.

(21) Appl. No.: 17/548,355

(22) Filed: Dec. 10, 2021

(65) Prior Publication Data

US 2023/0182302 A1 Jun. 15, 2023

(51) Int. Cl.
*B25J 9/16* (2006.01)

(52) U.S. Cl.
CPC .................................. *B25J 9/1674* (2013.01)

(58) Field of Classification Search
CPC ............................... B25J 9/1674; G05B 15/02
USPC ............................................................ 700/97
See application file for complete search history.

(56) References Cited

U.S. PATENT DOCUMENTS

| | | | |
|---|---|---|---|
| 6,470,301 B1 | 10/2002 | Barral | |
| 6,526,373 B1* | 2/2003 | Barral | B25J 9/1666 |
| | | | 703/2 |
| 6,847,922 B1 | 1/2005 | Wampler, II | |
| 7,512,459 B2 | 3/2009 | Watanabe et al. | |
| 8,401,698 B2 | 3/2013 | Kamrani et al. | |
| 8,571,706 B2 | 10/2013 | Zhang et al. | |
| 9,672,184 B1* | 6/2017 | Jain | G06F 11/2289 |
| 9,922,144 B2 | 3/2018 | Embon et al. | |
| 10,018,995 B2* | 7/2018 | Zhang | G05B 19/4188 |
| 2010/0241248 A1* | 9/2010 | Zhang | G05B 19/41885 |
| | | | 700/29 |
| 2014/0148949 A1* | 5/2014 | Graca | B25J 9/1682 |
| | | | 700/248 |
| 2020/0082033 A1* | 3/2020 | Hartsock | B25J 9/1671 |
| 2021/0220994 A1* | 7/2021 | Colasanto | B25J 9/1669 |

FOREIGN PATENT DOCUMENTS

| | | | | |
|---|---|---|---|---|
| CA | 2325005 A1 * | 5/2001 | ............ | B25J 9/1666 |
| EP | 1107082 A2 * | 6/2001 | ............ | B25J 9/1666 |
| JP | 2014104581 A * | 6/2014 | ............ | B25J 9/1671 |

(Continued)

OTHER PUBLICATIONS

Extended European Search Report for Application No. 22212335.8 dated Apr. 26, 2023.

(Continued)

*Primary Examiner* — Ronald D Hartman, Jr.
(74) *Attorney, Agent, or Firm* — Artegis Law Group, LLP

(57) ABSTRACT

A computer-implemented method for generating and evaluating robotic workcell solutions includes: determining a plurality of locations within a workcell volume, wherein each location corresponds to a possible workcell solution; for each location included in the plurality of locations, determining a value for a first robot-motion attribute for a first robot based on position information associated with the location and a trajectory associated with a component of the first robot; and, for each location included in the plurality of locations, computing a first value for a first performance metric based on the value for the first robot-motion attribute.

20 Claims, 8 Drawing Sheets

(56) References Cited

FOREIGN PATENT DOCUMENTS

| WO | WO-2009043369 A1 | * | 4/2009 | ............... B25J 19/06 |
| WO | WO-2009103335 A1 | * | 8/2009 | ........ G05B 19/41885 |

OTHER PUBLICATIONS

Zhang et al., "Virtual Engineering: Optimal Cell Layout Method for Improving Productivity for Industrial Robot", Robotics, Automation and Mechatronics, Sep. 21, 2008, pp. 6-11.

Vosniakos, G. C., & Matsas, E. (2010). Improving feasibility of robotic milling through robot placement optimization. Robotics and Computer-Integrated Manufacturing, 26(5), 517-525.

Spensieri, Domenico, Johan S. Carlson, Robert Bohlin, Jonas Kressin, and Jane Shi. "Optimal robot placement for tasks execution." Procedia CIRP 44 (2016): 395-400.

Hassan, Mahdi, Dikai Liu, and Gavin Paul. "Collaboration of multiple autonomous industrial robots through optimal base placements." Journal of Intelligent & Robotic Systems 90, No. 1-2 (2018): 113-132.

Caro, Stéphane, Claire Dumas, Sébastien Garnier, and Benoît Furet. "Workpiece Placement Optimization in Robotic-based Manufacturing." IFAC Proceedings vols. 46, No. 9 (2013): 819-824.

Ren, Shunan, Ying Xie, Xiangdong Yang, Jing Xu, Guolei Wang, and Ken Chen. "A method for optimizing the base position of mobile painting manipulators." IEEE Transactions on Automation Science and Engineering 14, No. 1 (2016): 370-375.

Yu, Qiankun, Guolei Wang, Tianyu Ren, Xiaotong Hua, and Ken Chen. "Starting Base Position Optimization in Integrated Task Planning for Mobile Manipulators Painting Large Workpieces." In ASME 2017 International Mechanical Engineering Congress and Exposition, pp. V002T02A076-V002T02A076. American Society of Mechanical Engineers, 2017.

* cited by examiner

TECHNIQUES FOR ROBOTIC WORKCELL DESIGN

BACKGROUND

Field of the Various Embodiments

The various embodiments relate generally to computer science and robotics, and, more specifically, to techniques for robotic workcell design.

Description of the Related Art

Robots are oftentimes employed for tasks that require high repetition, tasks that are or can be dangerous to humans, and/or tasks that require high-precision. For example, robots are frequently used in manufacturing applications and in environments that are hazardous to humans. As a general matter, robots are machines that are automated or semi-automated, programmable, and capable of complex planar or three-dimensional movements. In manufacturing applications, robots typically are stationary and are positioned to perform a specified task in a robotic workcell.

Proper placement of a manufacturing robot in a robotic workcell is quite important in order to prevent reachability issues, avoid singularities for one or more joints of the robot, and improve the overall performance of the robot during operation. Accordingly, positioning the base of a manufacturing robot within a robotic workcell is a critical aspect of designing the robotic workcell. The problem of determining the ideal base location for a robot within a robotic workcell in order to perform a defined task has been studied extensively, and various optimization processes have been developed in an effort to solve this problem. However, those optimization processes have certain drawbacks.

One drawback is that conventional optimization processes can be computationally complex, and are therefore time-consuming to set up and run. As a result, such processes are generally not suitable for a process of design iteration. Many conditions commonly occur in manufacturing applications that can create such computational complexity, such as when an area to be covered is larger than a reaching distance of a robotic arm, when the number of targets for the robotic arm is large, when a tool path of the robotic arm is fixed, and when a task involves complex motions on the end effector of the robot. In each of these instances, a conventional optimization process is not helpful to a user seeking an optimal robot location for a specific task, because the effort associated with programming and running such an optimization process is prohibitively large. Instead, the user typically relies on previous experience, trial and error, and/or tribal knowledge to select a location for a robot base, and has no way of quantifiably comparing robot performance at different Another drawback is that conventional optimization processes are limited to generating solutions involving a single optimization goal or a small set of optimization goals. However, the optimization goals for positioning a manufacturing robot can vary widely, depending on the nature of the task and the specific objectives of the user. Examples of such various and sometimes conflicting optimization goals include, without limitation, reachability to all targets, smoothness of motion, and energy efficiency, among others. Consequently, to assist a user in positioning a robot, a conventional optimization process must be designed to solve for a different cost function or combined cost function for every optimization goal or set of optimization goals a user might be interested in when locating a robot. Because mathematically-based optimization methods are not easily scalable to this type of problem, an optimization process that optimizes a solution for the specific goals for a given instance of robot installation is typically not available to the user. Therefore, unless an optimization process happens to be designed based on the goals for a specific instance of robot installation, the user must rely on personal experience and/or trial and error to select a robot location.

As the foregoing illustrates, what is needed in the art are more effective techniques for determining robot placement within a robotic workcell.

SUMMARY

A computer-implemented method for generating and evaluating robotic workcell solutions includes: determining a plurality of locations within a workcell volume, wherein each location corresponds to a possible workcell solution; for each location included in the plurality of locations, determining a value for a first robot-motion attribute for a first robot based on position information associated with the location and a trajectory associated with a component of the first robot; and, for each location included in the plurality of locations, computing a first value for a first performance metric based on the value for the first robot-motion attribute.

At least one technical advantage of the disclosed techniques relative to the prior art is that, with the disclosed techniques, a user can evaluate robot performance for various robot or workpiece locations within a robotic workcell, based on one or more user-defined performance metrics. For example, a weighted score based on the user-defined performance metrics enables the user to objectively compare robot performance for each valid robot or workpiece location within the workcell. A further advantage is that the disclosed techniques can be used to rapidly generate solutions for locations throughout an entire workcell. As a result, the user can iteratively test the salience of different performance metrics and/or weighted combinations of performance metrics and modify the performance metrics used to select a robot or workpiece location. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

Robot-Motion Attributes and Performance Metrics for Design Locations

Figure 1:
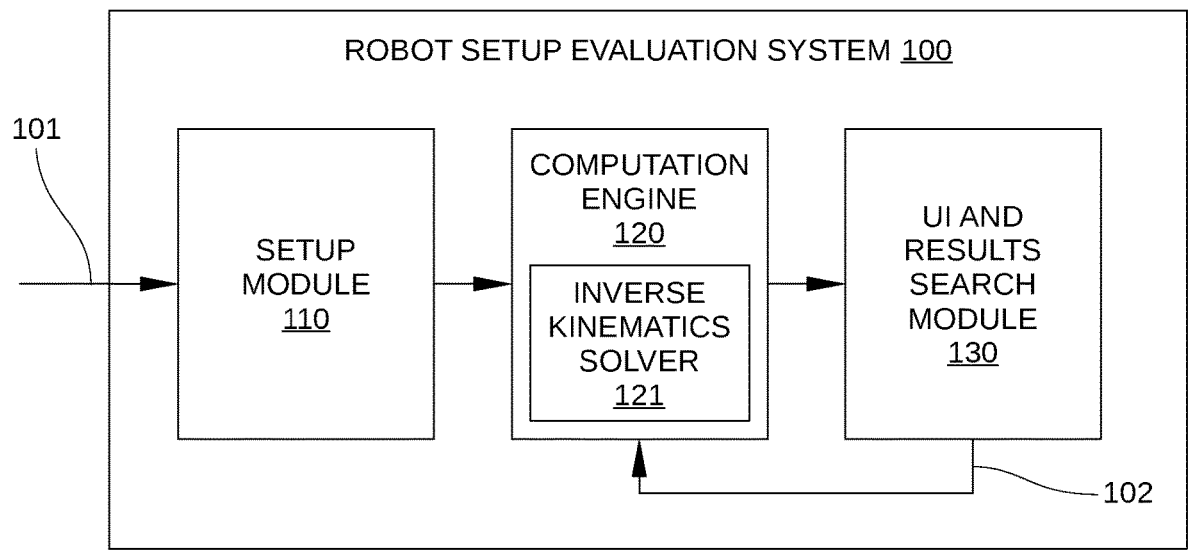
FIG. 1 illustrates a robot setup evaluation system configured to implement one or more aspects of the various embodiments.

FIG. 1 illustrates a robot setup evaluation system 100 configured to implement one or more aspects of the various embodiments. Robot setup evaluation system 100 is a computer-implemented system configured to determine valid setup solutions for a particular robotic workcell and to quantify the performance of each valid setup solution based on one or more user-defined performance metrics. Robot setup evaluation system 100 is further configured to facilitate user evaluation of the performance of valid setup solutions and user modification of the performance metrics that are employed to quantify the performance of the valid setup solutions. In the embodiment illustrated in FIG. 1, robot setup evaluation system 100 includes a setup module 110, a computation engine 120, and a user interface (UI) and results search module 130.

Setup module 110 is configured to enable a user (not shown) to provide design inputs 101 for defining a specific robotic setup problem. One example of such a robotic setup problem is the determination of a robot base location within a robotic workcell that enables high, peak, or ideal performance of a specified robot with respect to one or more user-defined performance metrics. Another such example is the determination of a workpiece location within a robotic workcell that enables high, peak, or ideal performance of a specified robot with respect to one or more user-defined performance metrics. According to various embodiments described in greater detail below, the user-defined performance metrics can quantify performance of the specified robot with respect to application-specific factors, rather than merely collision avoidance, singularity avoidance, and reachability.

In some embodiments, setup module 110 receives design inputs 101 via a UI generated by UI and results search module 130. User inputs 101 can include various inputs that define the design problem to be solved, such as a specific robotic setup problem within a robotic workcell. One embodiment of a robotic workcell is described below in conjunction with FIG. 2.

Figure 2:
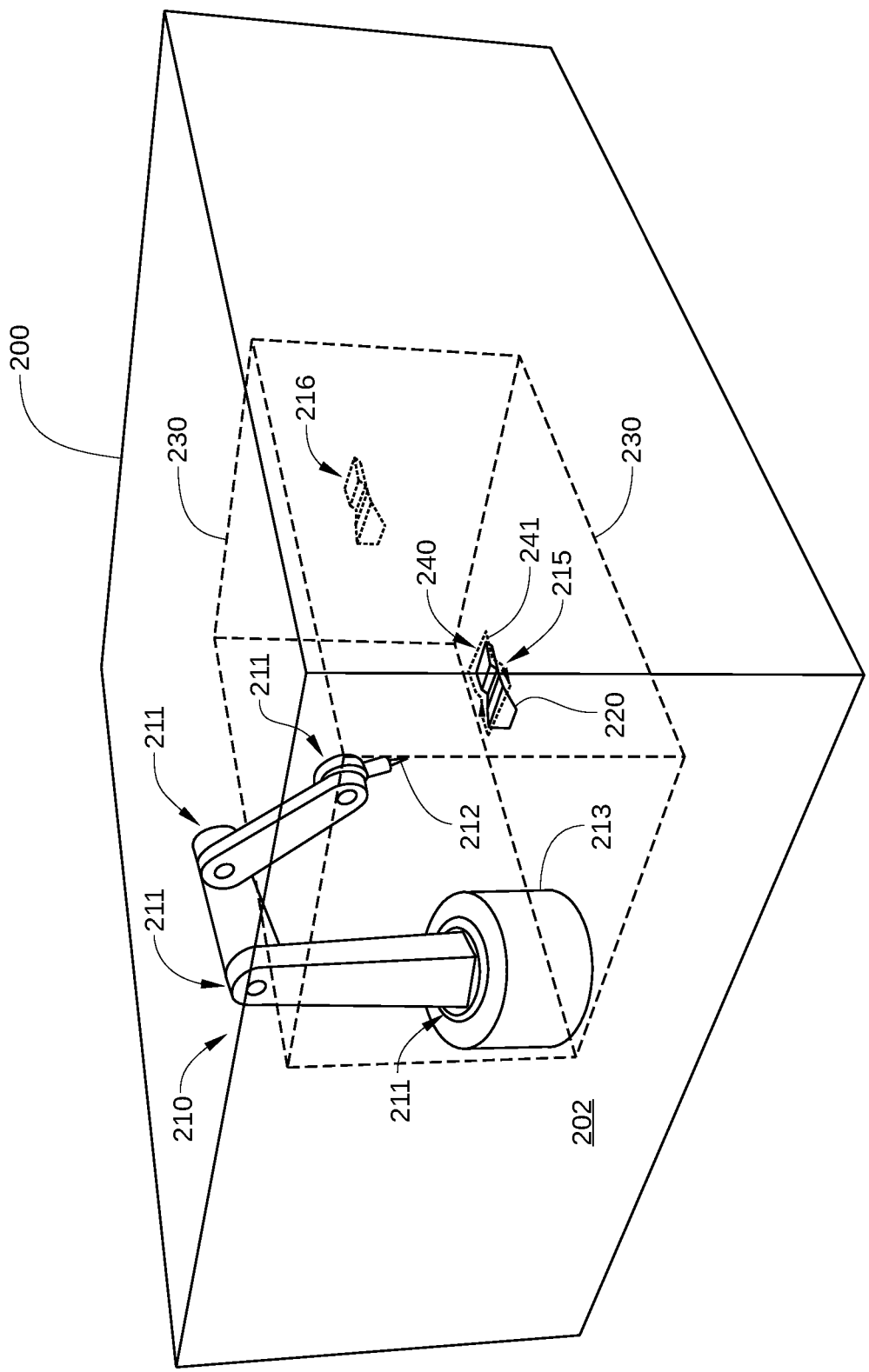
FIG. 2 is a conceptual illustration of a robotic workcell, according to various embodiments.

FIG. 2 is a conceptual illustration of a robotic workcell 200, according to various embodiments. Robotic workcell 200 is an operating environment for a robot 210 that is configured to perform a specific task. In some embodiments, the task includes performing one or more operations on a workpiece 220 that is disposed within robotic workcell 200, such as manufacturing-related operations, construction-related operations, and entertainment-related operations, among others. Examples of manufacturing-related operations that can be performed by robot 210 on workpiece 220 include welding, adhesive application, painting, coating, decoating, abrasion, subtractive manufacturing processes, additive manufacturing processes, and the like. Examples of construction-related operations that can be performed by robot 210 on workpiece 220 include large-scale assembly processes, material cutting (such as drywall, lumber, etc.), coating, painting, rendering, and the like. Examples of entertainment-related operations that can be performed by robot 210 on workpiece 220 include cinematography, controlled motion for visual effects production, programmed motions for in-person entertainment, controlled motion for a passenger ride, and the like.

Robotic workcell 200 includes a legal volume 230 within which potential robot base locations or workpiece locations (referred to herein as "design locations") can be positioned. In the embodiment illustrated in FIG. 2, legal volume 230 indicates the region within robotic workcell 200 in which workpiece 220 can be positioned. Thus, the legal volume 230 in FIG. 2 is configured for a robotic setup problem in which a workpiece location is determined that enables high, peak, or ideal performance of robot 210 during performance of a specified task associated with workpiece 220. In other embodiments, legal volume 230 can be configured for a robotic setup problem in which a robot base location is determined that enables high, peak, or ideal performance of robot 210 during performance of a specified task associated with workpiece 220.

Robot 210 can be any technically feasible robot that includes a stationary base 213, such as a Cartesian robot, a selective compliance articulated robot arm (SCARA) robot, an articulated robot, a delta robot, or a cylindrical robot, among others. In the embodiment illustrated in FIG. 2, stationary base 213 is disposed on an upward facing, horizontal surface, such as a floor 202. In other embodiments, stationary base 213 is disposed on another surface associated with robotic workcell 200 and/or at a different height than that shown in FIG. 2. Further, in some embodiments, a specific robotic setup problem associated with robotic workcell 200 includes determining an optimal or high-performing location for robot 210 on floor 202 or on some other surface associated with robotic workcell 200.

Typically, robot 210 includes two or more joints 211 that are each capable of motion that includes one or more degrees of freedom, such as rotation about an axis, extension along an axis, and/or the like. In the embodiment illustrated in FIG. 2, robot 210 further includes an end effector 212 that is configured according to the specific operation or operations to be performed by robot 210 in robotic workcell 200. For example, in some embodiments, end effector 212 includes a welding attachment, a workpiece manipulator, a paint-spraying head, a liquid applicator, and the like.

Workpiece 220 can be any object on which robot 210 can perform one or more operations. In some embodiments, workpiece 220 is disposed in a predetermined position 215 in robotic workcell 200, in which case the specific robotic setup problem associated with robotic workcell 200 includes determining an optimal or high-performing location for robot 210. That is, in such embodiments, predetermined position 215 is included in a robotic setup problem definition. In other embodiments, the specific robotic setup problem associated with robotic workcell 200 includes determining an optimal or high-performing location for workpiece 220. Thus, in such embodiments, workpiece 220 does not have a predetermined position and a predetermined position of robot 210 is included in the robotic setup problem definition.

In some embodiments, a trajectory 240 is disposed within robotic workcell 200 and associated with robot 210. For example, in an embodiment, trajectory 240 is associated with end effector 212 of robot 210. In some embodiments, trajectory 240 includes a path 241 (dashed line) in three-dimensional space defining the motion of a component of robot 210 within the robotic workcell, such as end effector 212. In some embodiments, trajectory 240 further includes a velocity profile (not shown) that defines a velocity of the component of robot 210 at different points along path 241. Thus, trajectory 240 defines the motion of a particular component of robot 210 while performing one or more operations on workpiece 220. For example, in some embodiments, trajectory 240 defines the path and velocity of end effector 212 for a painting, welding, abrading, coating, or other operation that is performed while workpiece 220 is disposed at predetermined position 215. Alternatively, in some embodiments, trajectory 240 defines the path and velocity of end effector 212 when relocating workpiece 220 from an initial location 216 in robotic workcell 200 to predetermined position 215.

In the embodiment illustrated in FIG. 2, a single trajectory 240 is associated with robot 210. In other embodiments, multiple trajectories (not shown) are disposed within robotic workcell 200 and associated with robot 210. For example, in one such embodiment, robot 210 performs multiple operations on workpiece 220, and for each operation a different trajectory 240 is associated with an end effector 212 of robot 210. Alternatively or additionally, in one such embodiment, a different trajectory 240 is associated with one or more of joints 211 of robot 210.

Returning to FIG. 1, as noted above, setup module 110 receives design inputs 101 via a UI, where design inputs 101 define a specific robotic setup problem to be solved for robotic workcell 200. In some embodiments, design inputs 101 include inputs defining dimensions of legal volume 230 in FIG. 2, which define the outer physical boundaries of the design problem. In such embodiments, the inputs defining dimensions of legal volume 230 can be based on one or more geometric primitives (e.g., a cube, a pyramid, etc.) and/or on specific dimensional values. In some embodiments, design inputs 101 include the locations of collision bodies or other proscribed regions within the legal volume. In some embodiments, design inputs 101 include information for one or more trajectories 240. In some embodiments, design inputs 101 include one or more limits or threshold values, for example for robot-motion attributes and/or user-defined performance parameters. In some embodiments, design inputs 101 include one or more weighting factors for generating a quality score based on multiple user-defined performance parameters.

In some embodiments, design inputs 101 include one or more simulation parameters. In such embodiments, the simulation parameters can include discretization values for defining design locations within the legal volume. In such embodiments, a more highly discretized legal volume corresponds to more closely spaced design locations that are evaluated by robot setup evaluation system 100 in a particular study. In some embodiments, the simulation parameters include a discretization value for defining a granularity at which to simulate an end effector trajectory. In such embodiments, the discretization value can indicate a number of discrete points along a trajectory 240 that are employed to simulate the end effector trajectory. It is noted that a higher discretization value results in more calculations being performed to generate robot-motion attributes for each design location (described below), while a lower discretization value increases the likelihood of failing to detect singularities, collisions, and/or optimal design locations.

In some embodiments, the simulation parameters include one or more parameters for an inverse kinematics solver 121 included in computation engine 120. In such embodiments, the parameters can include specific joint constraints to be enforced by inverse kinematics solver 121, specific joint configurations to be employed for one or more specified poses for end effector 212, and the like.

In some embodiments, user inputs 101 include one or more user-defined performance metrics for quantifiably evaluating the performance of each design location. In such embodiments, each of the user-defined performance metrics is based on one or more robot-motion attributes that are calculated for each design location in legal volume 230. As described below, such calculations can be performed by computation engine 120.

Each robot-motion attribute is a quantity of interest that can be calculated for each design location in legal volume 230. In some embodiments, robot-motion attributes are quantities that are based on the kinematics and/or dynamics of the motion of one or more components of a robot (e.g., robot 210 in FIG. 2) when an end effector (or other component) of the robot follows a specified trajectory (e.g., trajectory 240 in FIG. 2) to perform a specified operation. That is, in some embodiments, each robot-motion attribute can be one of a kinematic condition of the motion of a particular component of robot 210 or a dynamic condition of the motion of a particular component of robot 210. Thus, in some embodiments, robot-motion attributes that are determined for each design location in legal volume 230 include one or more of a position or displacement, a velocity, an acceleration, and a jerk. For example, in embodiments in which a robotic setup problem includes the determination of a robot base location within a robotic workcell, robot-motion attributes that are determined for each design location include a maximum velocity, a maximum acceleration, and a maximum jerk of an end effector of the robot that occur when the end effector follows a specified trajectory. Additionally or alternatively, in such embodiments, similar robot-motion attributes can be determined for one or more other components of the robot, such as one or more joints of the robot. Additionally or alternatively, in such embodiments, multiple values for each robot-motion attribute may be determined for each design location. For example, in some embodiments, for a particular component (or components) of the robot, a displacement, a velocity, an acceleration, and a jerk may be determined for multiple points along the specified trajectory. Thus, in such embodiments, one or more robot-motion attributes can be tracked along all or a portion of the specified trajectory, for one, some, or all movable components of the robot. In such embodiments, for each design location, multiple values for a particular robot-motion attribute can be tracked along the specified trajectory, for example by plotting such values along the specified trajectory. In such embodiments, a user is provided with another dimension of granularity in evaluating robot-motion attributes. For example, in an embodiment, a particular performance metric may be an average of a robot-motion attribute (e.g., jerk associated with a particular axis of rotation). In the embodiment, tracking values of the robot-motion attribute along the specified trajectory enables the user to differentiate the performance of two design locations that have the same average value for that particular performance metric: one design location may have a relatively low value across the trajectory for the robot-motion attribute except for a single large spike, while another design location with the same average value for the robot-motion attribute may have consistently higher values across the trajectory but be free of such a deleterious spike in value.

According to various embodiments, user-defined performance metrics are also determined for each design location in a legal volume, and are based on the values of one or more robot-motion attributes at the design location. Generally, the user-defined performance metrics are selected to enable the user to objectively compare the performance of each valid design location within the workcell with respect to one or more application-specific factors of interest to the user. For example, in one instance, a user setting up a robot in a factory that will perform the same operation for ten years may be interested in minimizing the energy consumption of the robot and/or factors that affect the lifetime of the robot. Thus, in such an instance, various embodiments enable the user to generate one or more performance metrics that quantify such factors, such as torque exerted on one or more joints of the robot, maximum forces exerted on one or more joints of the robot, and the like. In another instance, a user setting up a robot to perform a particular operation a single time may be interested in minimizing vibration at the end effector to achieve a specified accuracy. In such an instance, various embodiments enable the user to generate one or more performance metrics that quantify jerk or similar factors at some or all of the joints of the robot.

In some embodiments, a user may generate one or more performance metrics that quantify more complex aspects of a particular workcell setup, such as robot commissioning cost, lifetime operating cost, smoothness of end effector motion, and the like. In such embodiments, the performance metrics may be based on additional information besides the robot-motion attributes calculated for each design location. For example, in some embodiments, a robot commissioning cost metric can include information that is associated with: a particular model of robot that is to be positioned in a workcell; a specific configuration of the robot that is to be positioned in the workcell (e.g., a configuration that includes a customized base height vs. a configuration with a standard-height base); a mounting orientation of the robot (e.g., floor-mounted base vs. wall-mounted base vs. ceiling-mounted base); differing installation costs and/or operating costs that can vary based on design location, robot configuration, mounting orientation of the robot, model of the robot; and/or the like. In another example, in some embodiments, a lifetime operating cost metric can include information that is associated with: different replacement costs for the various joints of a robot, different wear rates for the various joints of a robot, a speed at which a specific operation or operations can be completed for each design location, and/or the like. According to various embodiments, setup module 110 enables such performance metrics to be implemented by a user, for example via a UI generated by UI and search results module 130. Thus, in some embodiments, one or more user-defined performance metrics are defined via design inputs 101.

Computation engine 120 is configured to perform the computations for generating robot-motion attributes for each design location in a legal volume (e.g., legal volume 230) and one or more user-defined performance metrics for each design location. Generally, the robot-motion attributes and user-defined performance metrics are based on design inputs 101, such as simulation parameters, parameters for inverse kinematics solver 121, one or more trajectories (for a component of the robot and/or for a workpiece), and/or other information. For example, in some embodiments, a specific robotic setup problem associated with a robotic workcell includes determining an optimal or high-performing location for a robot. In such embodiments, computation engine 120 simulates, for each design location in the robotic workcell, motion of the robot component(s) and/or workpiece through a specified trajectory or at specified points along such a trajectory. In such embodiments, motion of the robot can be simulated by inverse kinematics solver 121. In another example, in some embodiments, a specific robotic setup problem includes determining an optimal or high-performing location for a workpiece relative to a fixed robot location. In such embodiments, computation engine 120 simulates, for each design location in the robotic workcell, motion of the robot component(s) through a specified trajectory or at specified points along such a trajectory. In such embodiments, motion of the robot can be simulated by inverse kinematics solver 121.

In some embodiments, computation engine 120 is further configured to determine a quality score for some or all design locations in a robotic workcell. In such embodiments, computation engine 120 determines the quality score based on multiple user-defined performance metrics. In some embodiments, the quality score is based on a weighted combination of the multiple user-defined performance metrics. Further, in some embodiments, values for each of the multiple user-defined performance metrics is normalized, for example to a value between 0 and 1. In such embodiments, the values for a particular user-defined performance metric are normalized between a "best" value determined from all design locations and a "worst" value determined from all design locations. For example, when normalized in this way, the best value can be set to 1, the worst value set to 0, and the intermediary values set to an appropriate value between 0 and 1. Thus, in such embodiments, even though each user-defined performance metric can generally have significantly different ranges of values, the normalized values for the various user-defined performance metrics allow fair comparison and/or weighting of heterogeneous user-defined performance metrics.

In some embodiments, computation engine 120 is further configured to determine valid and invalid design locations. In some embodiments, design locations that fail to satisfy a reachability requirement and/or are associated with one more singularities are determined to be invalid design locations, and therefore are generally not considered eligible locations for solving the robotic display problem being analyzed by robot setup evaluation system 100. Additionally or alternatively, in some embodiments, design locations that exceed one more limits are determined to be invalid design locations. In some embodiments, such a limit is associated with one or more robot-motion attributes, such as a maximum acceleration limit for a certain component of the robot, a maximum jerk limit for a certain component of the robot, and/or the like. Additionally or alternatively, in some embodiments, a limit is associated with one or more user-defined performance metrics, such as a maximum energy consumption value, a minimum smoothness of motion value for a particular component of the robot, a maximum commissioning cost value, and/or the like. In some embodiments, such limits can be defined by a user in design inputs 101.

UI and Results Search

UI and results search module 130 is configured to generate a UI that enables a user to input design inputs 101. For example, in some embodiments, UI and results search module 130 is configured with dialogue windows, plugins, drop-down menus, and/or other features that enable a user to input dimensions of a legal volume, discretization values and/or other simulation parameters, parameters for inverse kinematics solver 121, user-defined performance metrics, and/or the like.

UI and results search module 130 is further configured to generate a UI that enables a user to evaluate the performance of each design location in a robotic workcell. For example, in some embodiments, UI and results search module 130 is configured to display robot-motion attributes, user-defined performance metrics, and/or a quality score for each design location in a legal volume. An embodiment of one such UI is described below in conjunction with FIG. 3.

Figure 3:
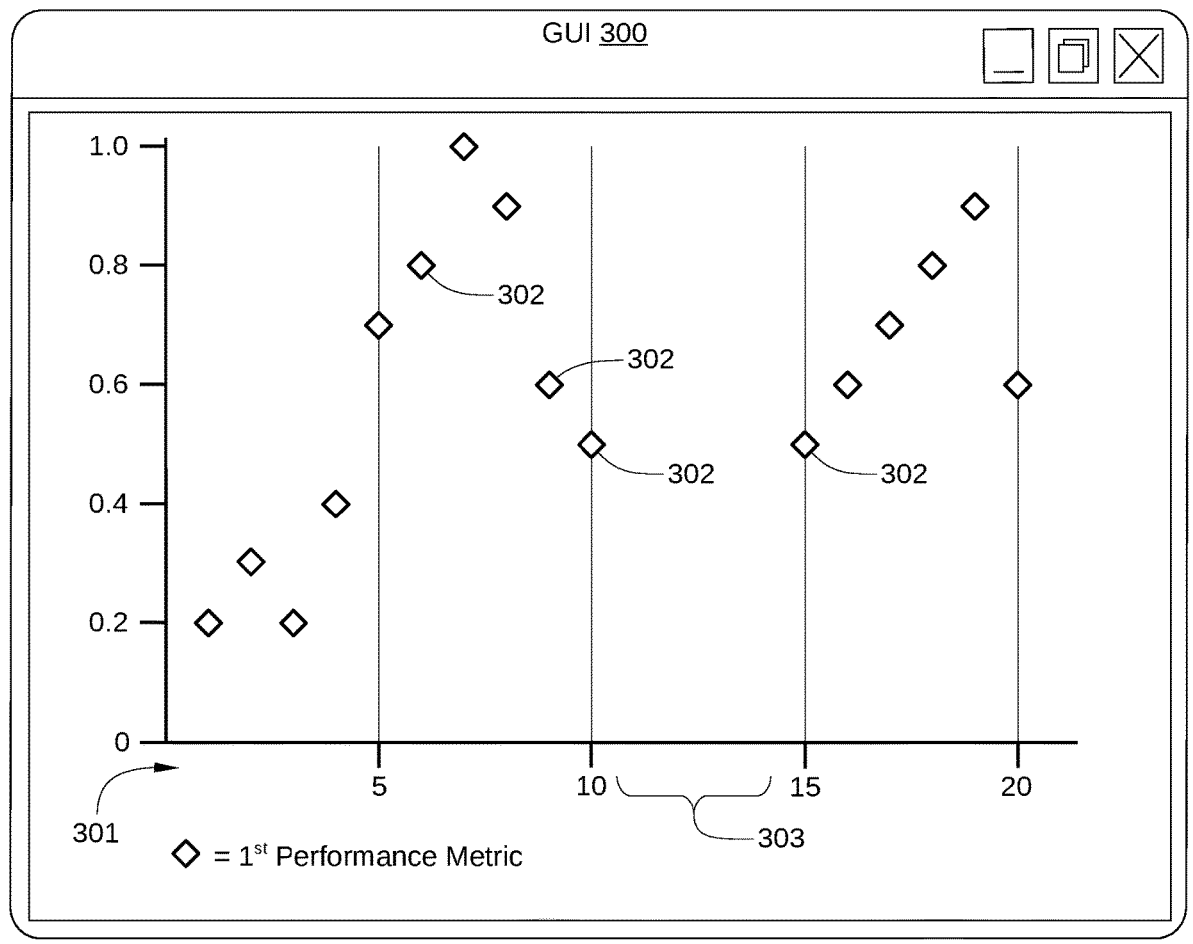
FIG. 3 is a schematic illustration of a graphical user interface for displaying information associated with multiple design locations within a robotic workcell, according to various embodiments.

FIG. 3 is a schematic illustration of a graphical user interface (GUI) 300 for displaying information associated with multiple design locations within a robotic workcell, according to various embodiments. GUI 300 displays, for each valid design location 301 in a robotic workcell, a calculated value 302 for a user-defined performance metric. In the embodiment illustrated in FIG. 3, no calculated value 302 is displayed for invalid design locations 303. GUI 300 enables a user to readily evaluate the performance of all valid design locations of a robotic workcell with respect to a specific user-generated performance metric.

In some embodiments, UI and results search module 130 is further configured to generate a UI that enables a user to evaluate the performance of each design location in a robotic workcell with respect to multiple user-generated performance metrics. An embodiment of one such UI is described below in conjunction with FIG. 4.

Figure 4:
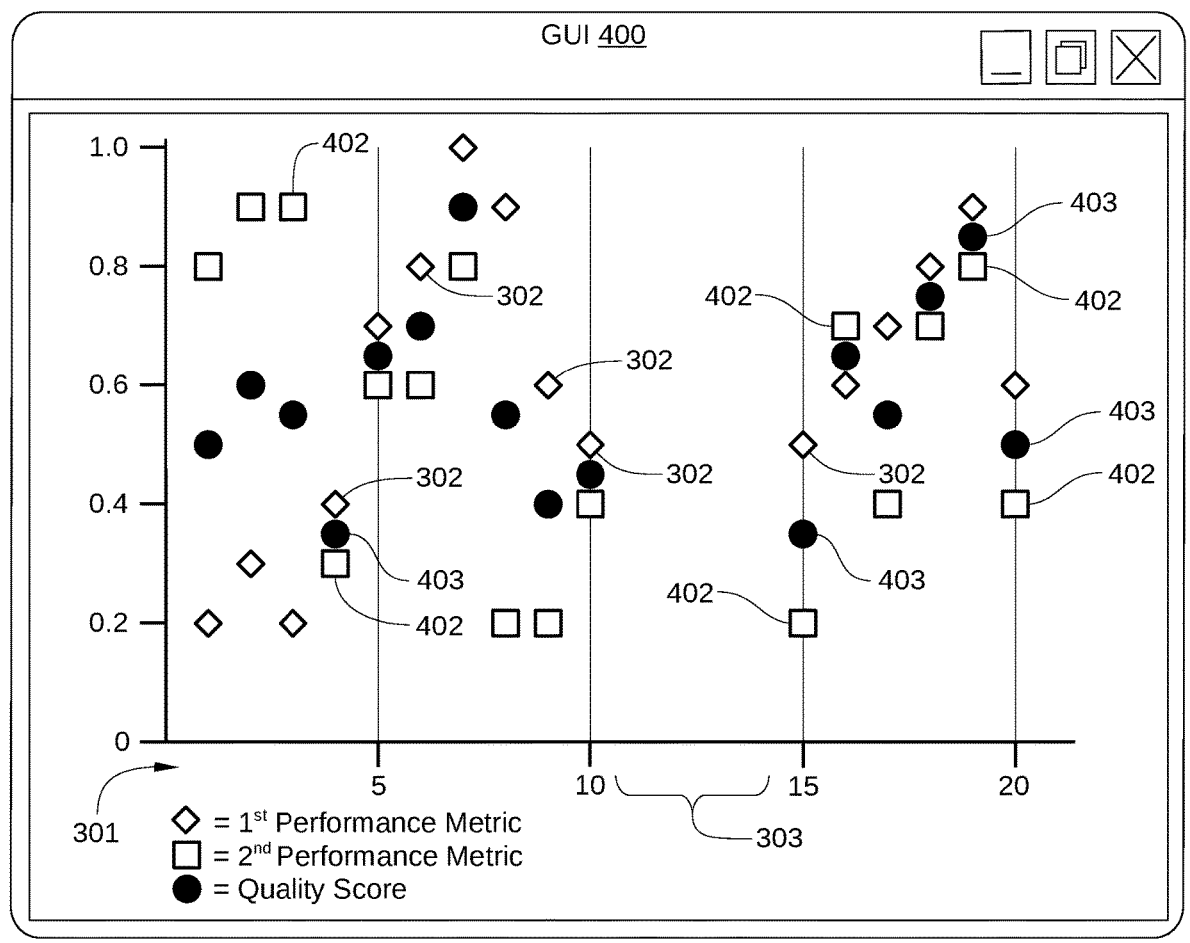
FIG. 4 is a schematic illustration of a graphical user interface for displaying information associated with multiple design locations within a robotic workcell, according to various other embodiments.

FIG. 4 is a schematic illustration of a graphical user interface (GUI) 400 for displaying information associated with multiple design locations within a robotic workcell, according to various other embodiments. GUI 400 displays, for each valid design location 301 in a robotic workcell, a calculated value 302 for a first user-defined performance metric and a calculated value 402 for a second user-defined performance metric. Thus, in the embodiment illustrated in FIG. 4, values determined for multiple disparate performance metrics can be displayed for each valid design location 301, such as commissioning cost vs. smoothness of motion, or robot operating cost vs. robot lifetime. In a similar vein, in some embodiments, GUI 400 can also be configured for displaying information associated with multiple robot-motion attributes for each valid design location 301 in a robotic cell. For example, in the embodiment illustrated in FIG. 4, GUI 400 includes a quality score value 403 for each valid design location 301, where the quality score value 403 is based on a combination of the calculated value 302 and the calculated value 402 for the valid design location 301.

Returning to FIG. 1, in some embodiments, the UI and results search module 130 is configured to enable a user to refine the results of a particular study performed by robot setup evaluation system 100. In such embodiments, a GUI generated by UI and results search module 130 displays valid design locations in a robotic workcell. Further, when a particular valid design location 102 is selected in the GUI by the user, computation engine 120 discretizes a region including and/or surrounding the selected design location into additional higher-granularity design locations, and determines values associated with each of the additional design locations for robot-motion attributes and user-defined performance metrics. An embodiment of one such UI is described below in conjunction with FIGS. 5A and 5B.

Figure 5A:
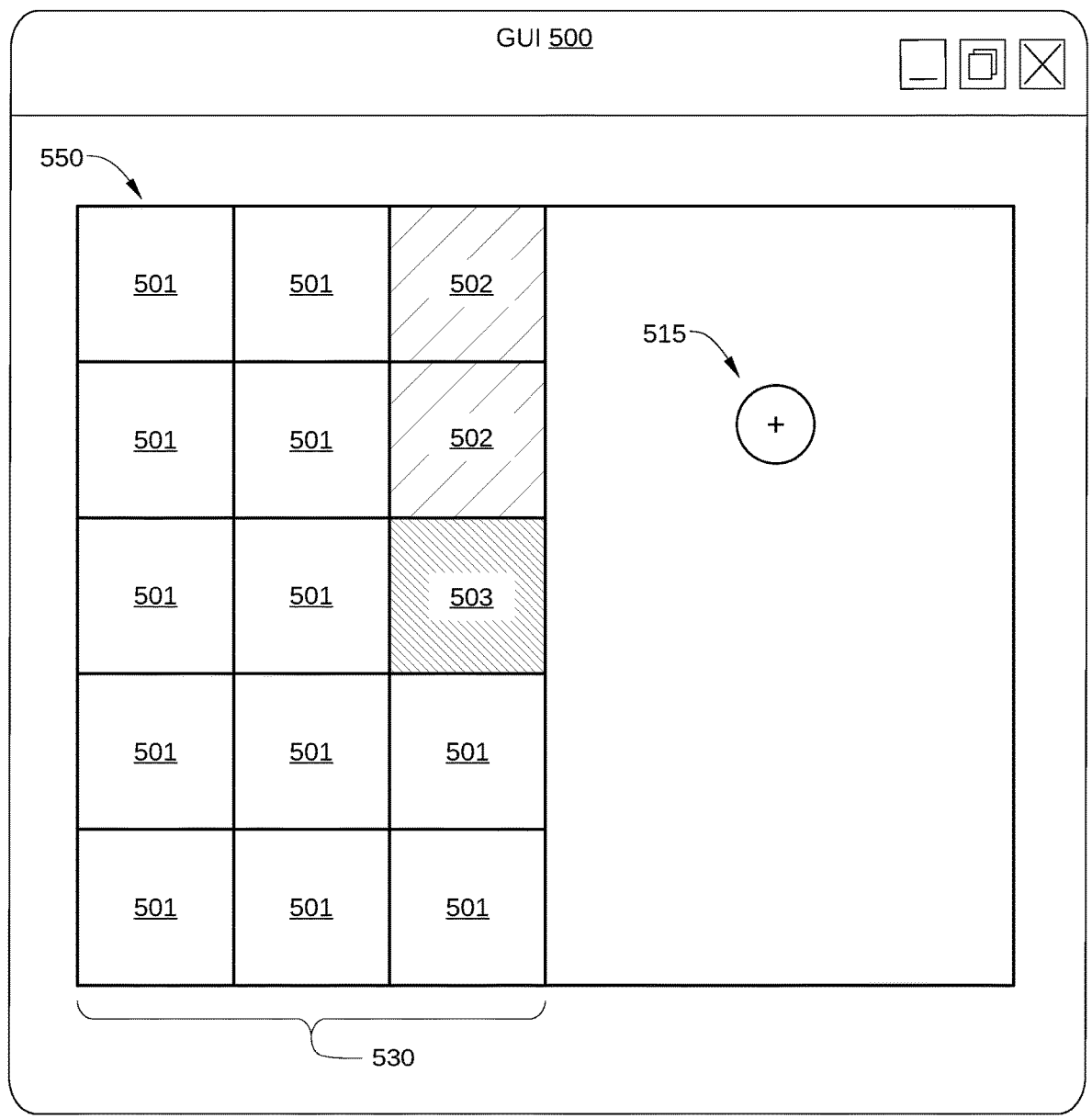
FIG. 5A is a schematic illustration of a graphical user interface for displaying valid design locations within a robotic workcell, according to various embodiments.

FIG. 5A is a schematic illustration of a GUI 500 for displaying valid design locations within a robotic workcell, according to various embodiments. In the embodiment illustrated in FIG. 5A, GUI 500 displays plan view of a robotic workcell 550, a legal region 530, and a workpiece location 515. Within legal region 530, GUI 500 further displays valid design locations 501 for a robot base (not shown), invalid design locations 502 for the robot base, and design locations 503 for the robot base that are associated with a singularity of at least one joint of a robot. In some embodiments, design locations 503 are a subset of invalid design locations 502. In the embodiment illustrated in FIG. 5A, legal region 530 is depicted as a two-dimensional region of a floor or other supporting surface. In other embodiments, legal region 530 includes a three-dimensional region, and GUI 500 may display valid design locations 501, invalid design locations 502, and design locations 503 in a three-dimensional format.

Figure 5B:
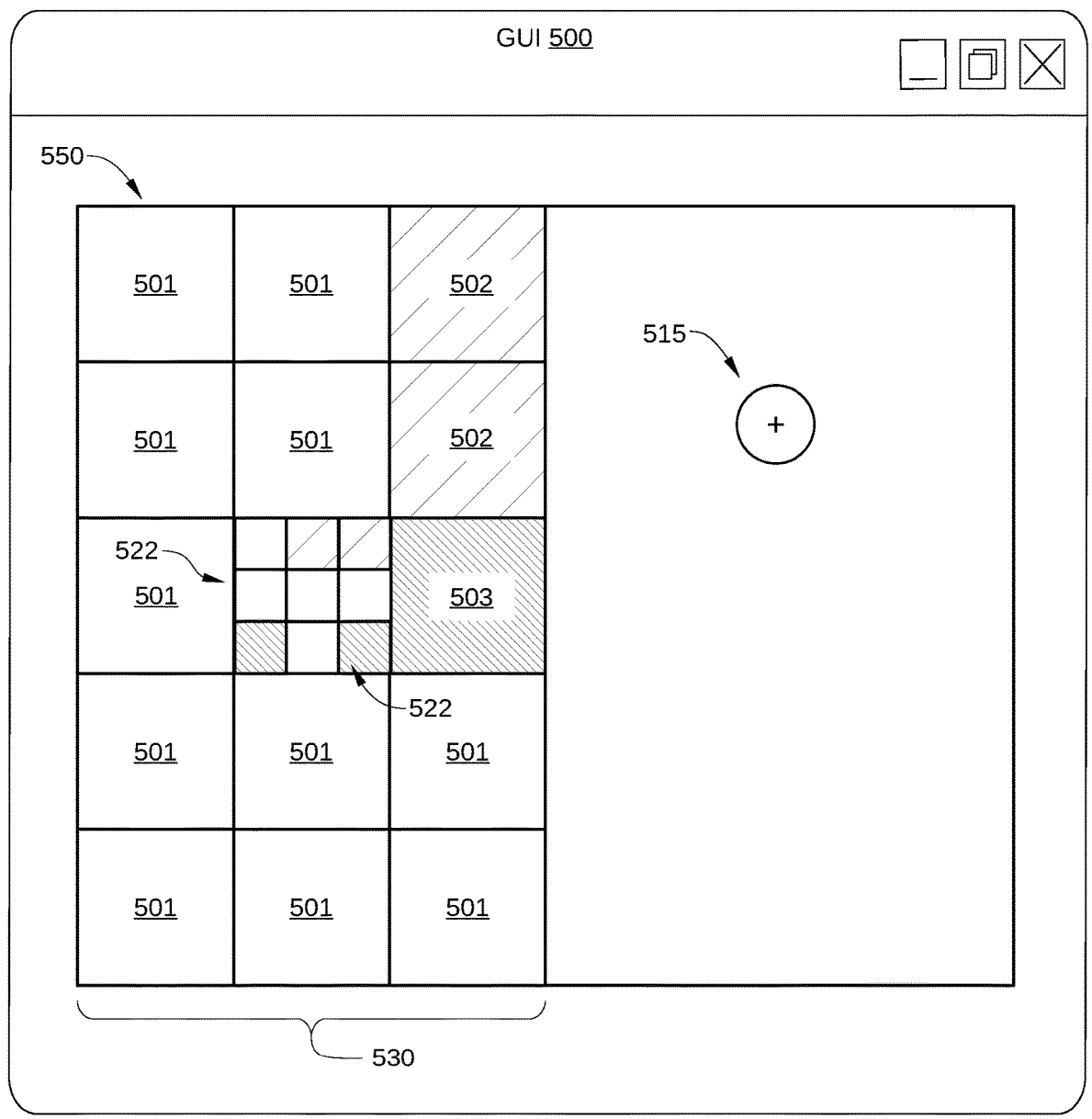
FIG. 5B is a schematic illustration of the graphical user interface of FIG. 5A after a specific valid design location has been selected by a user, according to various embodiments.

FIG. 5B is a schematic illustration of GUI 500 after a specific valid design location has been selected by a user, according to various embodiments. As shown, in response to a specific design location 521 being selected by a user, a plurality of higher-granularity design locations 522 are generated by computation engine 120 within legal region 530. In addition, computation engine 120 performs calculations for determining values for robot-motion attributes and one or more user-defined performance metrics for each of higher-granularity design locations 522. In the embodiment illustrated in FIG. 5B, specific design location 521 is replaced by higher-granularity design locations 522. Additionally or alternatively, in some embodiments, computation engine 120 generates higher-granularity design locations 522 in valid design locations 501 that are adjacent to specific design location 521. In either case, the addition of higher-granularity design locations 522 to legal region 530 provides more detailed information regarding values for robot-motion attributes and user-defined performance metrics in a selected portion of legal region 530. Thus, in such embodiments, even though legal region 530 can initially be a coarsely discretized solution space, a user can evaluate certain portions of legal region 530 via more closely-spaced design locations. In such embodiments, using higher-granularity design locations 522 to evaluate certain portions of legal region 530, a user can reduce the likelihood of missing singularities, invalid locations, and higher-performing design locations that may not be detectable via more coarsely spaced valid design regions 501.

Exemplary Implementation

Figure 6:
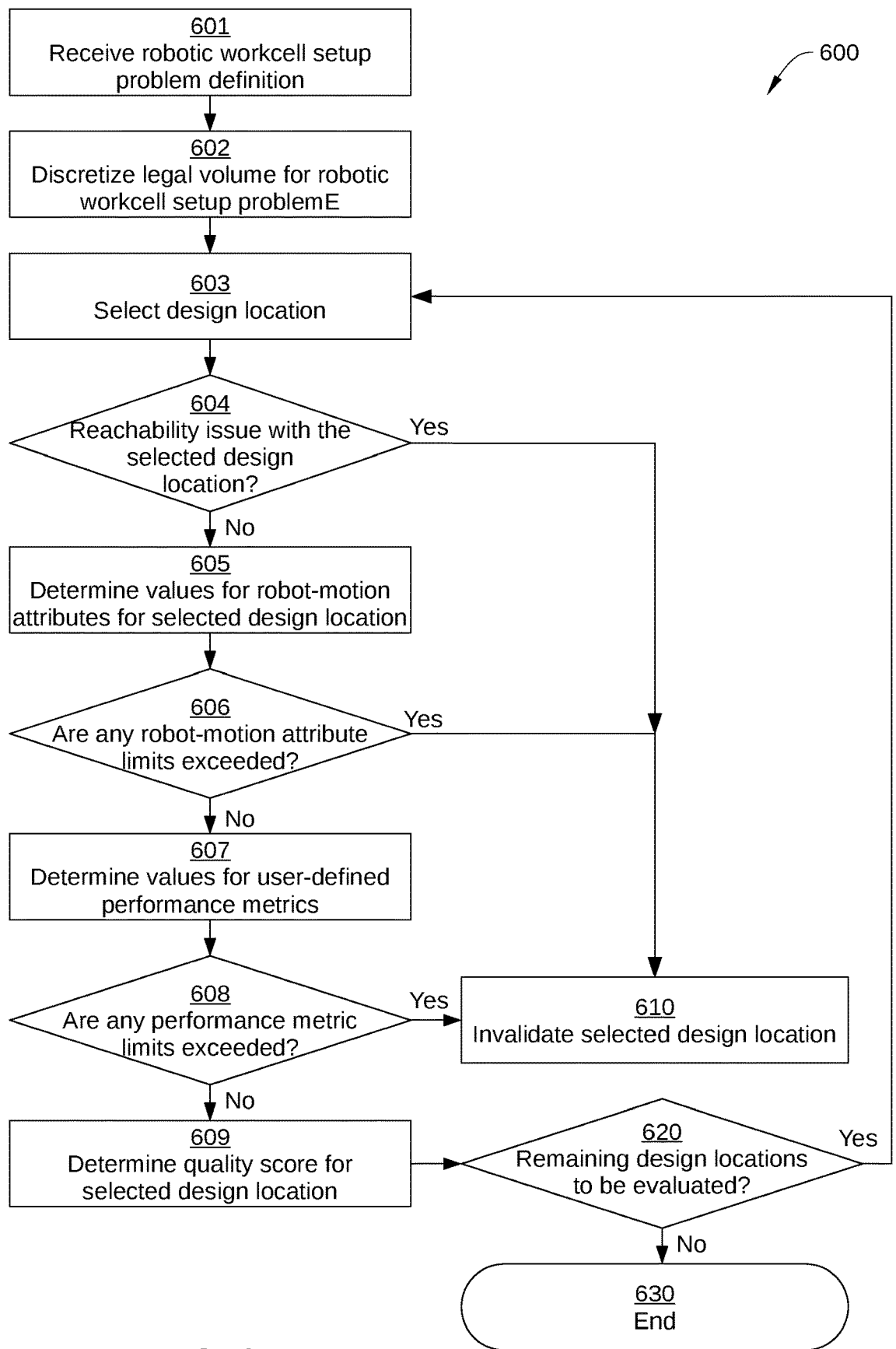
FIG. 6 sets forth a flow diagram of method steps for generating and evaluating performance of robotic workcell solutions, according to various embodiments.

FIG. 6 sets forth a flow diagram of method steps for generating and evaluating performance of robotic workcell solutions, according to various embodiments. For example, in some embodiments, a robotic workcell solution includes a specific base location for a robot, or a combination of a specific base location for a robot and a specific robot model or design. In other embodiments, a robotic workcell solution includes a specific location for a workpiece.

Although the method steps are described in conjunction with the systems of FIGS. 1-5B, persons skilled in the art will understand that any system configured to perform the method steps, in any order, is within the scope of the embodiments.

As shown, a computer-implemented method 600 begins at step 601, where robot setup evaluation system 100 receives information that defines a robotic workcell setup problem, such as design inputs 101. Generally, the robotic workcell problem includes the determination of a robot base location or workpiece location within a robotic workcell. In step 602, computation engine 120 discretizes a legal volume (e.g., legal volume 230) for the robotic workcell setup problem based on information included in design inputs 101. In step 603, computation engine 120 selects a particular design location from discretized legal volume.

In step 604, computation engine 120 determines whether there is a reachability issue associated with the selected design location, for example using inverse kinematics solver 121. For example, when the design location represents a potential location for workpiece 220, computation engine 120 determines whether robot 210 can reach the potential location. In another example, when the design location represents a potential robot base location for robot 210, computation engine 120 determines whether robot 210 can reach workpiece 220 when robot 210 is disposed at the potential location. When computation engine 120 determines there is a reachability issue associated with the selected design location, method 600 proceeds to step 610. When computation engine 120 determines there is no reachability issue associated with the selected design location, method 600 proceeds to step 605.

In step 605, computation engine 120 determines values for robot-motion attributes for the selected design location, such as position information, velocity information, acceleration information, and/or jerk information associated with one or more components of robot 210. Such information can be generated by inverse kinematics solver 121. In step 606, computation engine 120 determines whether any robot-motion attribute limits are exceeded at the selected design location. For example, in some embodiments, a maximum allowable acceleration or jerk value may be associated with one or more components of robot 210. When computation engine 120 determines that one or more robot-motion attribute limits are exceeded, method 600 proceeds to step 610. When computation engine 120 determines that no robot-motion attribute limits are exceeded at the selected design location, method 600 proceeds to step 607.

In step 607, computation engine 120 determines values for one or more user-defined performance metrics for the selected design location, such as commissioning cost, motion accuracy, operating cost, and the like. In step 609, computation engine 120 determines whether any performance metric limits are exceeded at the selected design location. For example, in some embodiments, a maximum allowable commissioning cost or minimum allowable motion accuracy may be associated with one or more components of robot 210. When computation engine 120 determines that one or more such performance metric limits are exceeded, method 600 proceeds to step 610. When computation engine 120 determines that no performance metrics limits are exceeded at the selected design location, method 600 proceeds to step 609. In step 609, computing engine 120 determines a quality score for the selected design location. In some embodiments, the quality score is based on two or more user-defined performance metrics.

In step 610, computing engine 120 invalidates the selected design location, for example due to a reachability issue associated with the selected design location, a robot-motion attribute limit being exceeded at the selected design location, or a performance metric limit being exceeded at the selected design location.

In step 620, computing engine 120 determines whether there are any remaining design locations to be evaluated. If yes, method 600 returns to step 603; if no, method 600 proceeds to step 630 and terminates.

Upon completion of method 600, a user can review, search, and otherwise access values for robot-limit attributes, user-defined performance metrics, and quality scores for each design location included in legal volume 230 for a particular study. Method 600 can then be repeated for additional studies, for example by quantifying the performance of a different robot or configuration of robot in the same robotic workcell. Thus, a user can quantify and evaluate the performance of different robots in a plurality of design locations using widely disparate, user-defined performance metrics. Further, as described above in conjunction with FIGS. 5A and 5B, a user can also refine the granularity of a particular study by selecting a particular design location for increased discretization.

Exemplary Computing Device

Figure 7:
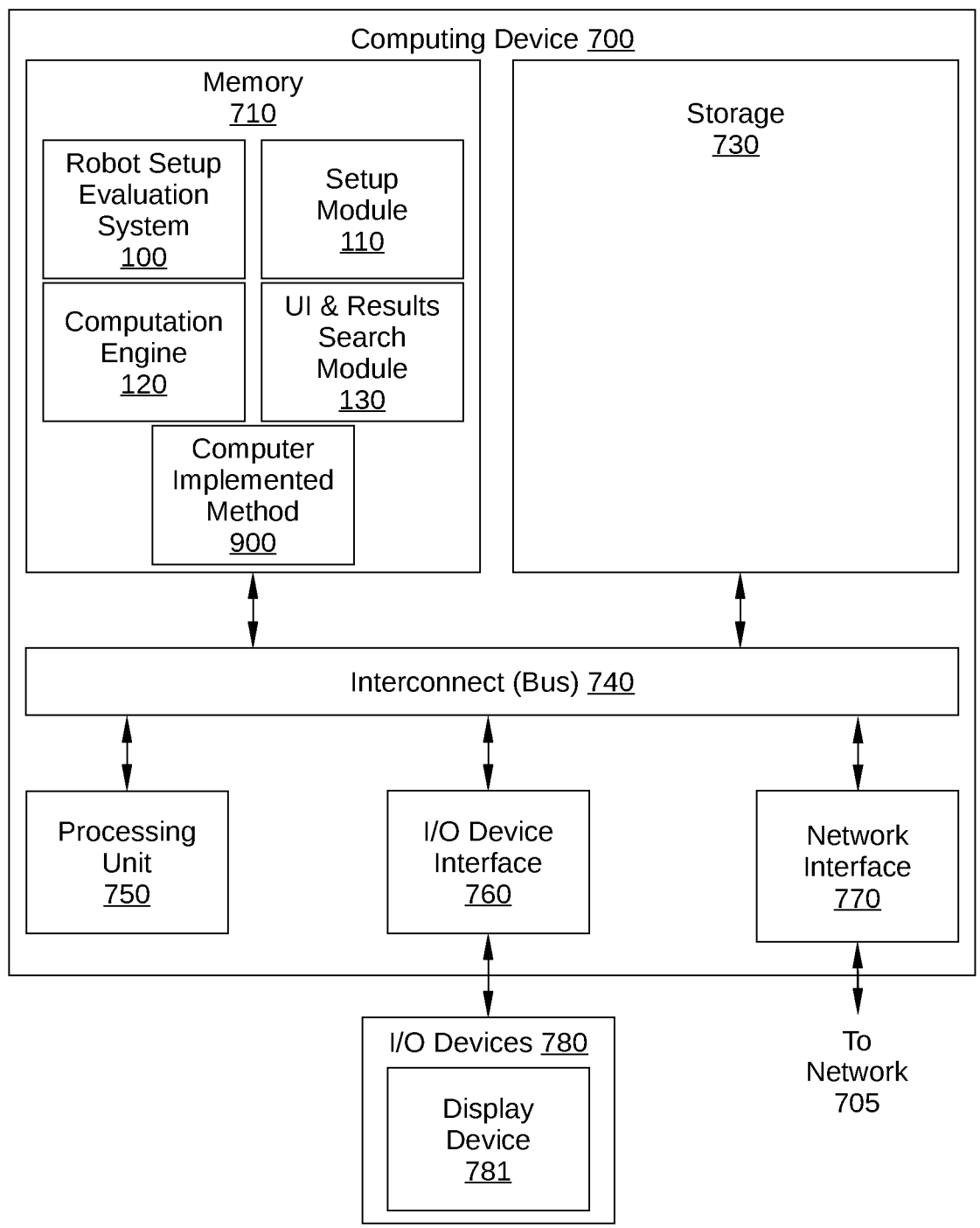
FIG. 7 is a block diagram of a computing device configured to implement one or more aspects of the various embodiments.

FIG. 7 is a block diagram of a computing device 700 configured to implement one or more aspects of the various embodiments. Computing device 700 may be a desktop computer, a laptop computer, a tablet computer, or any other type of computing device configured to receive input, process data, generate control signals, and display images. Computing device 700 is configured to run robot setup evaluation system 100, setup module 110, computation engine 120, UI and results search module 130, computer-implemented method 600 and/or other suitable software applications, which can reside in a memory 710. It is noted that the computing device described herein is illustrative and that any other technically feasible configurations fall within the scope of the present disclosure.

As shown, computing device 700 includes, without limitation, an interconnect (bus) 740 that connects a processing unit 750, an input/output (I/O) device interface 760 coupled to input/output (I/O) devices 780, memory 710, a storage 730, and a network interface 770. Processing unit 750 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 750 may be any technically feasible hardware unit capable of processing data and/or executing software applications, including run robot setup evaluation system 100, setup module 110, computation engine 120, UI and results search module 130, and/or computer-implemented method 600. Further, in the context of this disclosure, the computing elements shown in computing device 700 may correspond to a physical computing system (e.g., a system in a data center) or may be a virtual computing instance executing within a computing cloud.

I/O devices 780 may include devices capable of providing input, such as a keyboard, a mouse, a touch-sensitive screen, and so forth, as well as devices capable of providing output, such as a display device 781. Additionally, I/O devices 780 may include devices capable of both receiving input and providing output, such as a touchscreen, a universal serial bus (USB) port, and so forth. I/O devices 780 may be configured to receive various types of input from an end-user of computing device 700, and to also provide various types of output to the end-user of computing device 700, such as one or more graphical user interfaces (GUI), displayed digital images, and/or digital videos. In some embodiments, one or more of I/O devices 780 are configured to couple computing device 700 to a network 705.

Memory 710 may include a random access memory (RAM) module, a flash memory unit, or any other type of memory unit or combination thereof. Processing unit 750, I/O device interface 760, and network interface 770 are configured to read data from and write data to memory 710. Memory 710 includes various software programs that can be executed by processor 750 and application data associated with said software programs, including run robot setup evaluation system 100, setup module 110, computation engine 120, UI and results search module 130, and/or computer-implemented method 600.

In sum, the various embodiments described herein provide techniques for quantifying and evaluating the performance of valid robot setup solutions for a robotic workcell. The performance of each robot setup solution is quantified using one or more user-defined performance metrics that are based on robot-motion attributes. Values for the robot-motion attributes are determined by simulating a specified trajectory within the robotic workcell for each valid robot setup solution.

At least one technical advantage of the disclosed techniques relative to the prior art is that, with the disclosed techniques, a user can evaluate robot performance for various robot or workpiece locations within a robotic workcell, based on one or more user-defined performance metrics. For example, a weighted score based on the user-defined performance metrics enables the user to objectively compare robot performance for each valid robot or workpiece location within the workcell. A further advantage is that the disclosed techniques can be used to rapidly generate solutions for locations throughout an entire workcell. As a result, the user can iteratively test the salience of different performance metrics and/or weighted combinations of performance metrics and modify the performance metrics used to select a robot or workpiece location. These technical advantages provide one or more technological advancements over prior art approaches.

1. In some embodiments, a computer-implemented method for generating and evaluating robotic workcell solution includes: determining a plurality of locations within a workcell volume, wherein each location corresponds to a possible workcell solution; for each location included in the plurality of locations, determining a value for a first robot-motion attribute for a first robot based on position information associated with the location and a trajectory associated with a component of the first robot; for each location included in the plurality of locations, computing a first value for a first performance metric based on the value for the first robot-motion attribute.

2. The computer-implemented method of clause 1, further comprising, for each location included in the plurality of locations, determining a value for a second robot-motion attribute based on the position information associated with the location and the trajectory associated with the component of the first robot.

3. The computer-implemented method of clauses 1 or 2, wherein the first robot-motion attribute comprises one of a torque associated with the component of the first robot, a position associated with the component of the first robot, a velocity associated with the component of the first robot, an acceleration associated with the component of the first robot, a jerk associated with the component of the first robot, a collision indicator associated with the first robot, a reach indicator associated with the first robot, a singularity indicator associated with the first robot, or an energy consumption associated with the first robot.

4. The computer-implemented method of any of clauses 1-3, wherein the first robot-motion attribute comprises a kinematic condition associated with a motion of the component of the first robot or a dynamic condition associated with a motion of the component of the first robot.

5. The computer-implemented method of any of clauses 1-4, wherein the first performance metric is based on the first robot-motion attribute and a second robot-motion attribute.

6. The computer-implemented method of any of clauses 1-5, wherein the first performance metric is based on a combination of the first robot-motion attribute and a second robot-motion attribute, wherein the second robot-motion attribute is defined via a user input.

7. The computer-implemented method of any of clauses 1-6, further comprising, for each location included in the plurality of locations, determining a second value for a second performance metric.

8. The computer-implemented method of any of clauses 1-7, further comprising, for each location included in the plurality of locations, determining a quality score based on a weighted combination of the first value of the first performance metric and the second value of the second performance metric.

9. The computer-implemented method of any of clauses 1-8, further comprising: for each location included in the plurality of locations, determining a value for the first robot-motion attribute for a second robot based on the position information for the location and on a trajectory associated with a component of the second robot; and based on at least the value for the first robot-motion attribute for the second robot, for each location included in the plurality of locations, determining a second value for the first performance metric.

10. The computer-implemented method of any of clauses 1-9, further comprising: for each location included in the plurality of locations, determining a first quality score based on the first value of the first performance metric; and for each location included in the plurality of locations, determining a second quality score based on the second value of the second performance metric.

11. In some embodiments, a non-transitory computer readable medium stores instructions that, when executed by a processor, cause the processor to perform the steps of: determining a plurality of locations within a workcell volume, wherein each location corresponds to a possible workcell solution; for each location included in the plurality of locations, determining a value for a first robot-motion attribute for a first robot based on position information associated with the location and a trajectory associated with a component of the first robot; for each location included in the plurality of locations, computing a first value for a first performance metric based on the value for the first robot-motion attribute.

12. The non-transitory computer readable medium clause 11, the steps further comprising, for each location included in the plurality of locations, determining a value for a second robot-motion attribute based on the position information associated with the location and the trajectory associated with the component of the first robot.

13. The non-transitory computer readable medium of clauses 11 or 12, wherein the first robot-motion attribute comprises one of a torque associated with the component of the first robot, a position associated with the component of the first robot, a velocity associated with the component of the first robot, an acceleration associated with the component of the first robot, a jerk associated with the component of the first robot, a collision indicator associated with the first robot, a reach indicator associated with the first robot, a singularity indicator associated with the first robot, or an energy consumption associated with the first robot.

14. The non-transitory computer readable medium of any of clauses 11-13, wherein the trajectory associated with the component of the first robot at a first location within the workcell volume is the same as the trajectory associated with the component of the first robot at a second location within the workcell volume.

15. The non-transitory computer readable medium of any of clauses 11-14, wherein the trajectory associated with the component of the first robot at a first location within the workcell volume is different than the trajectory associated with the component of the first robot at a second location within the workcell volume.

16. The non-transitory computer readable medium of any of clauses 11-15, the steps further comprising, prior to determining the value for the first robot-motion attribute, generating the trajectory associated with the component for the first robot at the first location and generating the trajectory associated with the component of the first robot at the second location.

17. The non-transitory computer readable medium of any of clauses 11-16, wherein determining the plurality of locations within the workcell volume comprises discretizing the workcell volume based on one or more user input values.

18. The non-transitory computer readable medium of any of clauses 11-17, wherein the position information associated with the location comprises information indicating a position of a base of the first robot relative to the trajectory or information indicating a position of a workpiece relative to the base of the first robot.

19. The non-transitory computer readable medium of any of clauses 11-18, wherein the first robot-motion attribute comprises a kinematic condition associated with a motion of the component of the first robot or a dynamic condition associated with a motion of the component of the first robot.

20. In some embodiments, a system includes: a memory that stores instructions; and a processor that is communicatively coupled to the memory and is configured to, when executing the instructions, perform the steps of: determining a plurality of locations within a workcell volume, wherein each location corresponds to a possible workcell solution; for each location included in the plurality of locations, determining a value for a first robot-motion attribute for a first robot based on position information associated with the location and a trajectory associated with a component of the first robot; and for each location included in the plurality of locations, computing a first value for a first performance metric based on the value for the first robot-motion attribute.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating and evaluating robotic workcell solutions, the method comprising:
   determining a plurality of locations for a first robot within a workcell volume, wherein each location corresponds to a possible workcell solution;
   for each location included in the plurality of locations, determining a value for a first robot-motion attribute for the first robot based on position information associated with the location and a trajectory associated with a component of the first robot;
   for each location included in the plurality of locations, computing a first value for a first performance metric based on the value for the first robot-motion attribute.

2. The computer-implemented method of claim 1, further comprising, for each location included in the plurality of locations, determining a value for a second robot-motion attribute based on the position information associated with the location and the trajectory associated with the component of the first robot.

3. The computer-implemented method of claim 1, wherein the first robot-motion attribute comprises one of a torque associated with the component of the first robot, a position associated with the component of the first robot, a velocity associated with the component of the first robot, an acceleration associated with the component of the first robot, a jerk associated with the component of the first robot, a collision indicator associated with the first robot, a reach indicator associated with the first robot, a singularity indicator associated with the first robot, or an energy consumption associated with the first robot.

4. The computer-implemented method of claim 1, wherein the first robot-motion attribute comprises a kinematic condition associated with a motion of the component of the first robot or a dynamic condition associated with a motion of the component of the first robot.

5. The computer-implemented method of claim 1, wherein the first performance metric is based on the first robot-motion attribute and a second robot-motion attribute.

6. The computer-implemented method of claim 1, wherein the first performance metric is based on a combination of the first robot-motion attribute and a second robot-motion attribute, wherein the second robot-motion attribute is defined via a user input.

7. The computer-implemented method of claim 1, further comprising, for each location included in the plurality of locations, determining a second value for a second performance metric.

8. The computer-implemented method of claim 7, further comprising, for each location included in the plurality of locations, determining a quality score based on a weighted combination of the first value of the first performance metric and the second value of the second performance metric.

9. The computer-implemented method of claim 1, further comprising:
   for each location included in the plurality of locations, determining a value for the first robot-motion attribute for a second robot based on the position information for the location and on a trajectory associated with a component of the second robot; and
   based on at least the value for the first robot-motion attribute for the second robot, for each location included in the plurality of locations, determining a second value for the first performance metric.

10. The computer-implemented method of claim 9, further comprising:
    for each location included in the plurality of locations, determining a first quality score based on the first value of the first performance metric; and
    for each location included in the plurality of locations, determining a second quality score based on the second value of the second performance metric.

11. A non-transitory computer readable medium storing instructions that, when executed by a processor, cause the processor to perform the steps of:
    determining a plurality of locations for a first robot within a workcell volume, wherein each location corresponds to a possible workcell solution;
    for each location included in the plurality of locations, determining a value for a first robot-motion attribute for the first robot based on position information associated with the location and a trajectory associated with a component of the first robot;
    for each location included in the plurality of locations, computing a first value for a first performance metric based on the value for the first robot-motion attribute.

12. The non-transitory computer readable medium of claim 11, the steps further comprising, for each location included in the plurality of locations, determining a value for a second robot-motion attribute based on the position information associated with the location and the trajectory associated with the component of the first robot.

13. The non-transitory computer readable medium of claim 12, wherein the trajectory associated with the component of the first robot at a first location within the workcell volume is different than the trajectory associated with the component of the first robot at a second location within the workcell volume.

14. The non-transitory computer readable medium of claim 13, the steps further comprising, prior to determining the value for the first robot-motion attribute, generating the trajectory associated with the component for the first robot at the first location and generating the trajectory associated with the component of the first robot at the second location.

15. The non-transitory computer readable medium of claim 11, wherein the first robot-motion attribute comprises one of a torque associated with the component of the first robot, a position associated with the component of the first robot, a velocity associated with the component of the first robot, an acceleration associated with the component of the first robot, a jerk associated with the component of the first robot, a collision indicator associated with the first robot, a reach indicator associated with the first robot, a singularity indicator associated with the first robot, or an energy consumption associated with the first robot.

16. The non-transitory computer readable medium of claim 11, wherein the trajectory associated with the component of the first robot at a first location within the workcell volume is the same as the trajectory associated with the component of the first robot at a second location within the workcell volume.

17. The non-transitory computer readable medium of claim 11, wherein determining the plurality of locations within the workcell volume comprises discretizing the workcell volume based on one or more user input values.

18. The non-transitory computer readable medium of claim 11, wherein the position information associated with the location comprises information indicating a position of a base of the first robot relative to the trajectory or information indicating a position of a workpiece relative to the base of the first robot.

19. The non-transitory computer readable medium of claim 11, wherein the first robot-motion attribute comprises a kinematic condition associated with a motion of the component of the first robot or a dynamic condition associated with a motion of the component of the first robot.

20. A system, comprising:
a memory that stores instructions; and
a processor that is communicatively coupled to the memory and is configured to, when executing the instructions, perform the steps of:
determining a plurality of locations for a first robot within a workcell volume, wherein each location corresponds to a possible workcell solution;
for each location included in the plurality of locations, determining a value for a first robot-motion attribute for the first robot based on position information associated with the location and a trajectory associated with a component of the first robot; and
for each location included in the plurality of locations, computing a first value for a first performance metric based on the value for the first robot-motion attribute.

* * * * *